UNITED STATES PATENT OFFICE.

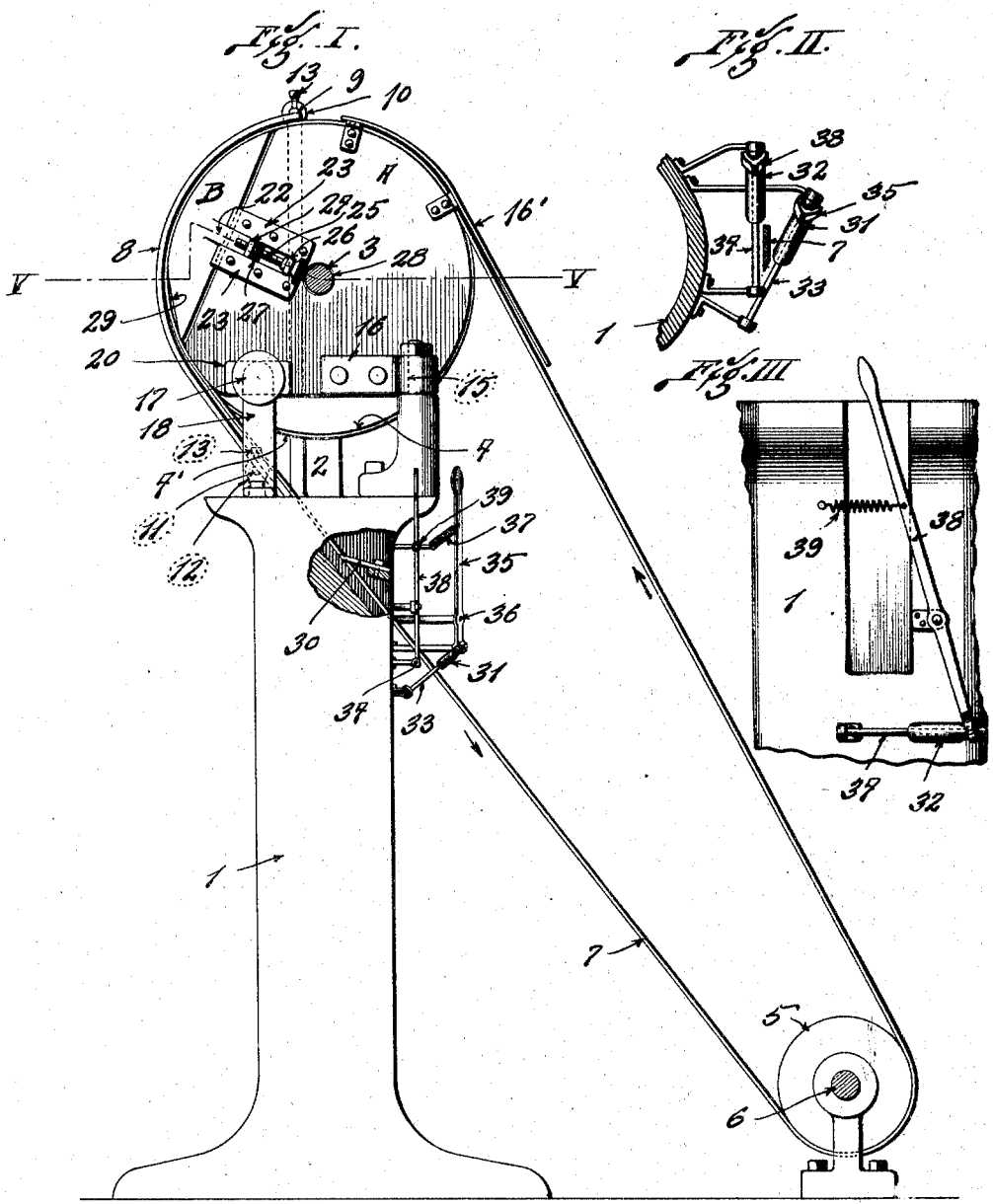

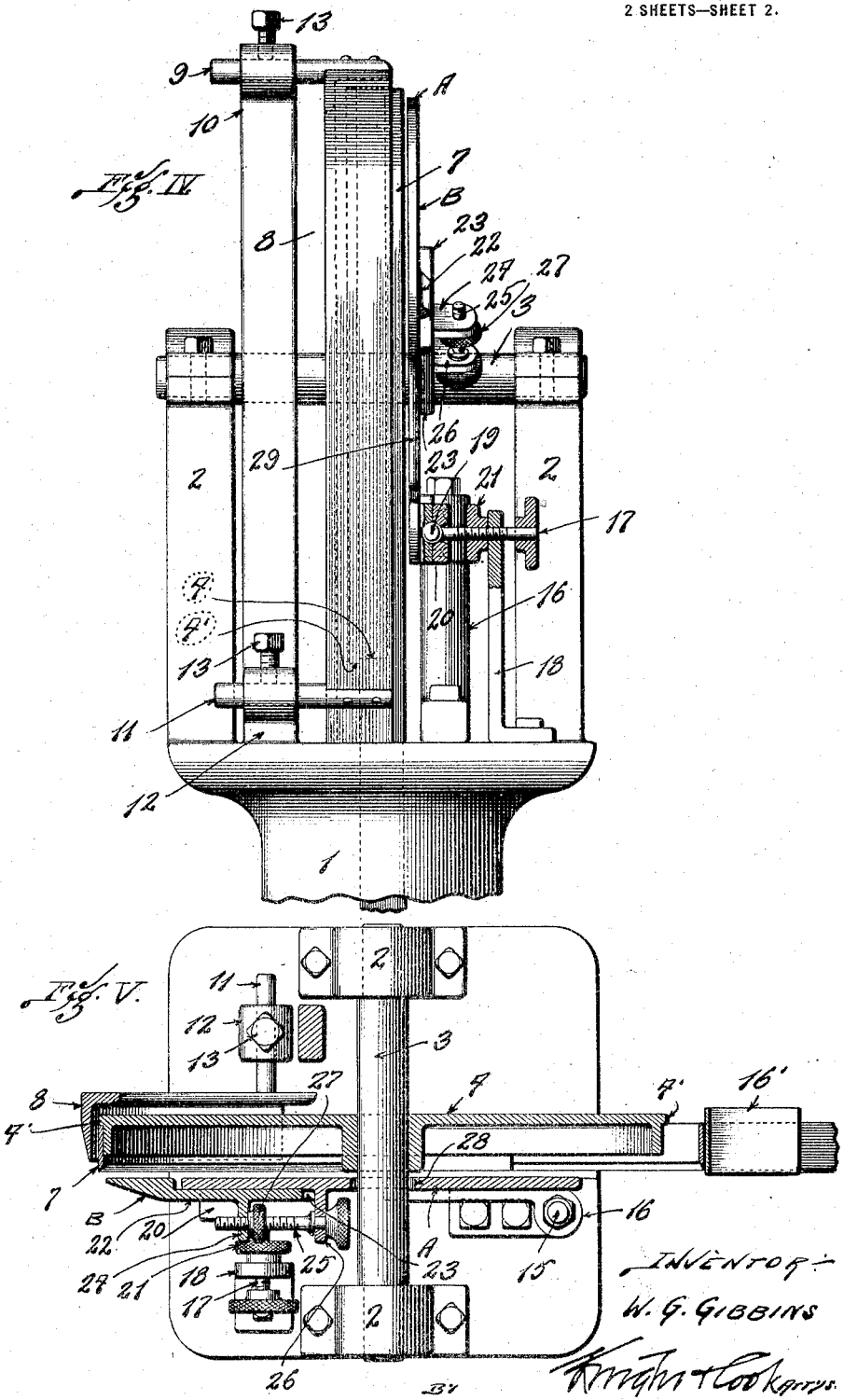

WILLIAM G. GIBBINS, OF ST. LOUIS, MISSOURI; HENRY GIBBINS EXECUTOR OF SAID WILLIAM G. GIBBINS, DECEASED.

FLESHING-MACHINE.

1,307,732.  Specification of Letters Patent.  Patented June 24, 1919.

Application filed April 12, 1916. Serial No. 90,566.

*To all whom it may concern:*

Be it known that I, WILLIAM G. GIBBINS, a subject of the King of Great Britain, a resident of the city of St. Louis, State of Missouri, have invented certain new and useful Improvements in Fleshing-Machines, of which the following is a full, clear, and exact description, reference being had to the accompanying drawings, forming a part of this specification.

My invention relates to a fleshing machine adapted for use in removing superfluous flesh, etc., from animal skins. A fleshing knife in the form of a long flexible endless band has many advantages over a circular fleshing knife, but owing to certain conditions which are essential to the desired stretching and shaving operations, the flexible band knives of the prior art have not met with success in actual service.

Therefore, one of the objects of my invention is to produce a fleshing machine having a fleshing knife in the form of a long flexible endless band, and elements associated therewith in such a manner that the skin may be held properly and subjected to the required stretching action while it is exposed to the cutting edge of the band knife. In this connection it is important to note that the elements of a fleshing machine should be so constructed and arranged that the operator can pull the skin along the cutting edge of the moving knife, at the same time stretching the skin in different directions at the point where it is acted upon by the knife. That is to say, the stretching action should not be that which will naturally result from merely pulling the skin in opposite directions, the object being to enlarge the skin by stretching it uniformly in all directions at the fleshing knife.

To accomplish the above mentioned results, the preferred form of the invention comprises a fleshing knife in the form of a flexible band fitted to pulleys which may be driven by any suitable power mechanism. The flexible band knife will bend freely to conform to the curvature of the peripheries of the pulleys, and arcuate guards are located near one of the pulleys to expose an arcuate portion of the band knife. The skin may be pulled very firmly across the arcuate portions of the guards with the result of causing the skin to conform to the curvature of said guards while it is being pulled across them, thus stretching the skin in various different directions at the point where it is acted upon by the band knife.

Another object of the invention is to produce a simple and efficient means for sharpening the knife.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claim hereunto appended.

Figure I is a side elevation, partly in section, illustrating a fleshing machine constructed in accordance with the invention.

Fig. II is an enlarged fragmentary horizontal section showing the sharpening devices.

Fig. III is an enlarged detail view illustrating one of the sharpening devices.

Fig. IV is an enlarged front elevation, partly in section, of the upper portion of the machine shown in Fig. I.

Fig. V is an enlarged section taken approximately on the line V—V, Fig. I.

1 designates a base or pedestal provided with bearings 2 at its upper end. A shaft 3 rotatably mounted in said bearings is secured to a pulley 4. 5 designates a drive pulley (Fig. I) secured to the power shaft 6 which may be driven by any suitable power mechanism.

A fleshing knife 7, in the form of a long endless flexible band, is fitted to the pulleys 4 and 5. The pulley 4 is provided at one of its edges with an annular shoulder 4' adapted to engage an edge of the band knife to retain the latter in its operative position.

An arcuate peripheral guard 8, in the form of an angle bar, extends partly around the curved portion of the knife at the pulley 4. A finger 9 extending from the upper end of the guard 8, is slidably fitted to a bearing 10, and a finger 11 extending from the lower portion of said guard is slidably mounted in a bearing 12. The guard 8 may be adjusted transversely of the fleshing knife 7 and it may be secured by tightening the set screws 13 in the bearings 10 and 12. These set screws engage the fingers 9 and 11 to secure the guard 8 after it has been adjusted to the desired position. The side guard, located at one side of the pulley 4, is a sectional structure consisting of a carrier member A and a section B adjustably secured to said carrier member. A shield 16', secured to the carrier A, extends over a portion of the knife. The carrier member A is pivotally supported by a vertical post 15 (Figs. I and V) and a hinge element 16 secured to said member A. The means for turning the carrier A and its guard section B about the axis of the pivot member 15 comprises an adjusting screw 17 passing through a screw threaded bearing 18 and provided with a ball 19 at its inner end as shown in Fig. IV. A sectional socket 20 is secured to the carrier member A and the ball 19 is loosely fitted to this socket. A jam nut 21, on the adjusting screw 17, may be forced against the bearing member 18 to prevent the screw from turning in said bearing, thus locking the carrier section A to prevent it from turning on the pivot member 15.

An extension 22, formed on the guard section B, is arranged between and slidably fitted to a pair of guides 23 on the carrier member A. A lug 24, projecting from the extension 22, is threaded to receive an adjusting screw 25, the latter being rotatably mounted in a lug 26 on the carrier member A. The guard section B may be adjusted independently of the carrier A by turning the adjusting screw 25, thereby sliding the extension 22 between the guides 23, and after said guard section has been adjusted to the desired position, it may be locked by forcing the jam nut 27 into engagement with the lug 24.

The opening 28, formed in the carrier member A to receive the shaft 3, (Fig. I) is large enough to permit said carrier member to swing to a limited degree without striking said shaft.

From the foregoing it will be understood that the guard members may be adjusted toward and away from the cutting edge of the knife 7 to vary the depth of the cut. The guard section B is cut away, as indicated at 29 in Fig. I to expose a portion of the flexible knife at the point where said knife is curved to conform to the curvature of the periphery of the pulley 4.

In the practical use of the machine, the animal skin is pulled very tightly across the arcuate portions of the guards so as to stretch the skin in various different directions, as previously pointed out. While the skin is in this stretched condition it is acted upon by an arcuate portion of the flexible knife at the point indicated by 29 in Fig. I. Obviously, the machine may be used for removing superfluous flesh from animal skins, and also for shaving the flesh side of the skin as is well understood in this art.

The flexible band knife travels in the direction indicated by arrows in Fig. I, and the matter adhering thereto is removed by a stationary scraper 30. This scraper is adapted to engage a straight portion of the knife at a point between the pulleys 4 and 5 so as to prevent the matter carried by the knife from reaching the pulley 5 where it would tend to collect between said pulley and the knife.

Means for sharpening the knife comprises a pair of sharpening rolls 31 and 32, arranged at opposite sides of a straight portion of the knife and adapted to engage the cutting edge thereof. The sharpening roll 31 is rotatably mounted on a fixed shaft 33, and the roll 32 is rotatably mounted on a fixed shaft 34. The axis of the sharpening roll 31 is parallel with the inclined face of the cutting edge of the knife (Fig. II) and the axis of the roll 32 is parallel with the opposite face of the cutting edge. An operating lever 35, pivotally supported at 36 is loosely secured to the roll 31. A spring 37 (Fig. I) tends to retain the operating lever 35 in the position shown in the drawings. The roll 31 is free to slide on the shaft 33 and it may be forced along the beveled face of the cutting edge of the knife by oscillating the lever 35. An operating lever 38, loosely secured to the sharpening roll 32 may be oscillated to reciprocate said roll on the fixed shaft 34. A spring 39, secured to the lever 38, tends to retain the roll 32 out of the path of the knife. When the sharpening rolls engage the knife they will rotate freely in response to the movement of said knife, and while rotating they are reciprocated on the fixed shafts 33 and 34.

I claim :—

In a fleshing machine, a fleshing knife, rotary members supporting said knife, a shaft at the axis of one of said rotary members, a peripheral guard adjacent to said knife, and a side guard comprising a carrier section having an opening for the reception of said shaft, a support to which said carrier section is hinged, means for adjusting said carrier section about the axis of its hinge, a guard section carried by said carrier section, and means for adjusting said guard section toward and away from said peripheral guard.

WILLIAM G. GIBBINS.